US009197906B1

United States Patent
Kathol et al.

(10) Patent No.: US 9,197,906 B1
(45) Date of Patent: Nov. 24, 2015

(54) AIRCRAFT CABIN MANAGEMENT SYSTEM

(75) Inventors: Shawn Kathol, Diamond Bar, CA (US); Donald J. Kearney, Fairfax, IA (US); Paul W. Sapp, Mission Viejo, CA (US); Etienne Deneault, Quebec, CA (US); Phillip W. Bonesteele, Santa Ana, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 394 days.

(21) Appl. No.: 13/614,718

(22) Filed: Sep. 13, 2012

(51) Int. Cl.
  *H04N 21/00* (2011.01)
  *H04N 21/214* (2011.01)
  *H04L 29/06* (2006.01)

(52) U.S. Cl.
  CPC ............ *H04N 21/00* (2013.01); *H04L 63/00* (2013.01); *H04N 21/2146* (2013.01)

(58) Field of Classification Search
  CPC .... G01C 23/00; G01C 23/005; G08G 5/0021; G08G 5/0013; G08G 5/0052
  USPC .............. 701/1, 3; 340/971; 725/6, 73, 75
  See application file for complete search history.

(56) References Cited

U.S. PATENT DOCUMENTS

| 6,676,027 | B1 * | 1/2004 | Noordmans et al. | 237/43 |
| 7,028,304 | B1 * | 4/2006 | Weinberger et al. | 719/310 |
| 2007/0199043 | A1 * | 8/2007 | Morris | 725/143 |
| 2013/0031215 | A1 * | 1/2013 | Macrae et al. | 709/219 |

FOREIGN PATENT DOCUMENTS

WO   WO 2010130992 A1 * 11/2010

OTHER PUBLICATIONS

Innovative Advantage, AVDS Product Sheet, published on website Mar. 8, 2012, according to http://archive.org/web/.*
Innovative Advantage, AVDS Product Sheet downloaded as a pdf from http://www.in-advantage.com/products/products_html on Sep. 13, 2012; 2 pages.

* cited by examiner

*Primary Examiner* — Helal A Algahaim
*Assistant Examiner* — Jelani Smith
(74) *Attorney, Agent, or Firm* — Angel N. Gerdzhikov; Donna P. Suchy; Daniel M. Barbieri

(57) ABSTRACT

An aircraft cabin management system including a) a communication interface system; b) a seat interface system; c) at least one Cabin Distribution Unit (CDU); and, d) a communication network. The communication interface system includes an integrated Cabin Server Unit (CSU) providing the combined functionality of aircraft communications, networking, and computational resources; and, an Information Maintenance Portal (IMP) providing maintenance access for the users of the aircraft cabin management system and the users of avionics equipment. The seat interface system includes a number of Modular Seat Interface Units (MSIUs), each MSIU providing device input/output connections for a defined portion of the interior of the aircraft cabin. The communication network operatively interconnects the communication interface system; the seat interface system; and the at least one CDU, as well as other equipment installed in the aircraft. The aircraft cabin management system provides an integrated communications and service backbone.

19 Claims, 1 Drawing Sheet

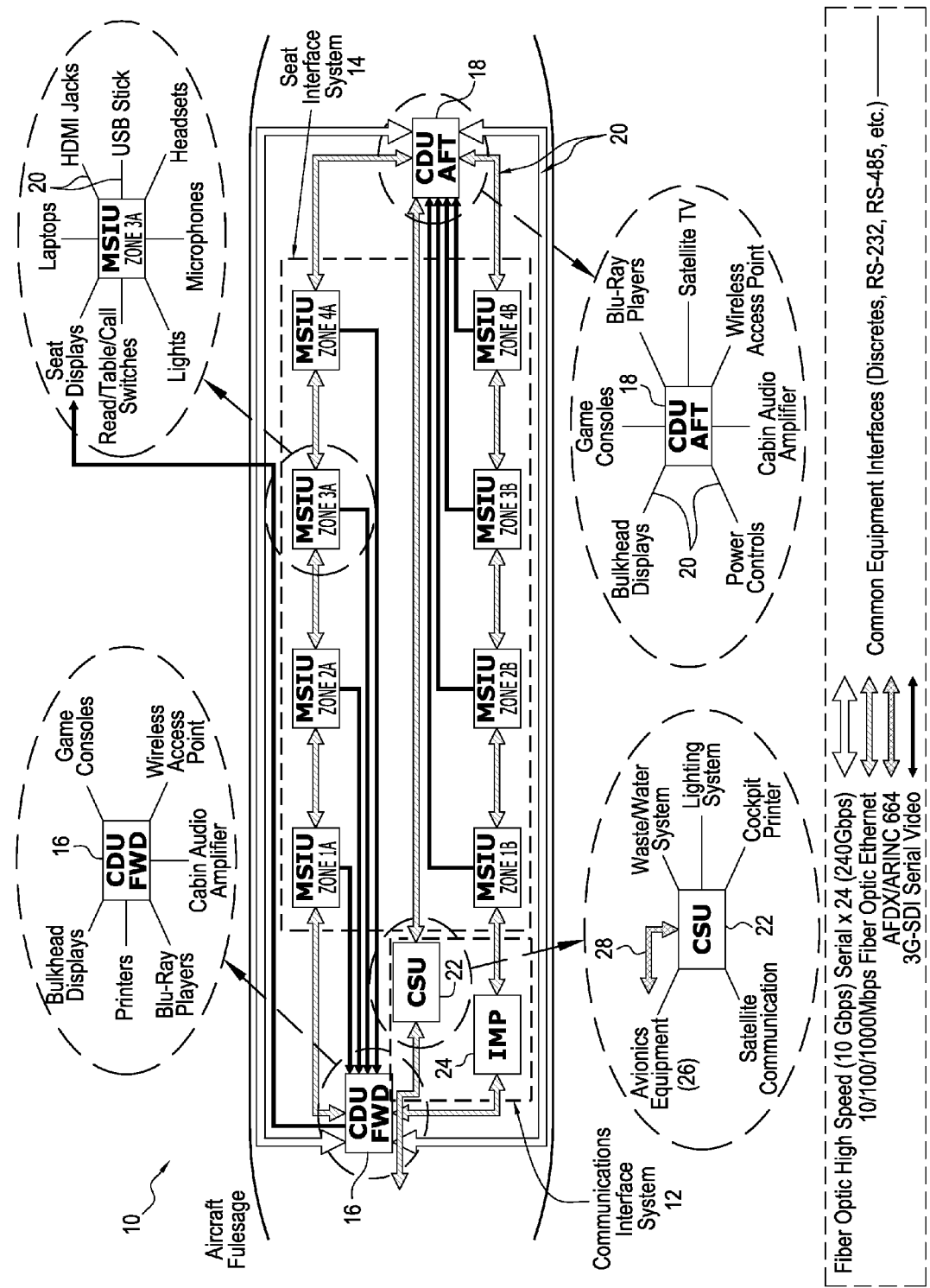

AIRCRAFT CABIN MANAGEMENT SYSTEM

BACKGROUND OF THE INVENTION

1. Field of the Invention

The present invention relates generally to aircraft cabin management systems (CMSs) for business and personal jets and more particularly to an aircraft cabin management system that integrates the traditional functionality of cabin controls and entertainment with enhanced aircraft communication networking, equipment, and services.

2. Description of the Related Art

Typical cabin management systems provide switch panels, displays, and entertainment source equipment (such as Blu-Ray or DVD players) which allow the aircraft passengers to control various aspects of the cabin environment such as lighting, temperature, and window shades, as well as providing audio and video entertainment equipment to watch movies, satellite TV channels, a moving map display; and/or to listen to music or radio. A modern Cabin Management System has many functions which are analogous to a home automation system combined with a home theatre system.

A CMS system provides a variety of services such as a control system (analogous to a home automation controller) and entertainment services (analogous to a Home Theater server) which provide for data storage and software for operating the system. A piece of equipment which supports such services may be referred to as a Cabin Server Unit (CSU).

Traditional CMS systems have been evolving to include additional communication capabilities such as a wired Ethernet network and/or a wireless (Wi-Fi) network which allows passengers with their own personal carry-on equipment, such as laptop computers, tablets, and smart phones, to connect into the CMS provided network. The CMS network is also connected to an Airborne Data Router (ADR) on the aircraft which bridges to one of several possible air-to-ground communication systems on the aircraft, such as a satellite communication (SATCOM) system. This allows passengers to access and control features of the CMS using their personal equipment as well as to access the internet on the ground.

Typically separate from a CMS system on the aircraft is a voice telephony switching (PBX) system which provides handsets and equipment for both pilot and passenger use, allowing phone calls to be made and received. The PBX is also bridged through communication equipment such as a SATCOM system.

As part of its avionics systems packages, Rockwell Collins, Inc. provides equipment called an Information Management System (IMS). This equipment organizes and transfers data packages to and from the aircraft in support of the avionics mission. For example, navigation chart databases may be transferred onto the aircraft via the IMS, and flight logs and maintenance history data may be transferred off the aircraft. Similar data transfer needs exist for the CMS system and have traditionally been implemented independently from avionics solutions.

As commercial technologies have evolved in recent years, the traditional boundaries separating some types of services have blurred together. For example, traditional telephony systems have merged with Voice-over-IP (VOIP) networks to the point where smart phone users may be switching back and forth between cellular radio calls and VOIP calls over Wi-Fi seamlessly.

In designing a CMS system, there are engineering tradeoffs made with regard to such matters as the size, weight, power consumption, and reliability of each individual piece of equipment (referred to as a Line Replaceable Unit (LRU)) in the system. Optimizing for some parameters (such as having fewer, larger LRUs) are balanced against competing factors (such as longer/heavier cable runs as a result of fewer LRUs).

A typical aircraft today has separate LRUs for each of these functions (an ADR, PBX, IMS, and CSU). As will be disclosed below, merging of these functions, in accordance with the principles of the present invention, results in substantial improvements in aircraft performance by reducing weight and complexity. In addition, this invention involves optimization of equipment design within the cabin for the distribution of wiring and processing performed at the passenger locations.

SUMMARY OF THE INVENTION

In a broad aspect, the present invention is embodied as an aircraft cabin management system including a) a communication interface system; b) a seat interface system; c) at least one Cabin Distribution Unit (CDU); and, d) a communication network. The communication interface system includes an integrated Cabin Server Unit (CSU) providing the combined functionality of aircraft communications, networking, and computational resources; and, an Information Maintenance Portal (IMP) providing maintenance access for the users of the aircraft cabin management system and the users of avionics equipment. The seat interface system includes a number of Modular Seat Interface Units (MSIUs), each MSIU providing device input/output connections for a defined portion of the interior of the aircraft cabin. The communication network operatively interconnects the communication interface system; the seat interface system; and the at least one CDU, as well as other equipment installed in the aircraft. The aircraft cabin management system provides an integrated communications and service backbone.

The defined portion preferably includes a half-zone of the interior. The half-zone is defined to be a section of the cabin interior on either the left or right side of the aircraft which contains any of: a pair of seats facing a table; two pairs of seats facing a table; a credenza; a sofa; or a crew rest compartment.

Other objects, advantages, and novel features will become apparent from the following detailed description of the invention when considered in conjunction with the accompanying drawings.

BRIEF DESCRIPTION OF THE DRAWINGS

FIG. 1 is a block diagram of the aircraft cabin management system of the present invention.

DETAILED DESCRIPTION OF THE INVENTION

Referring now to the drawings and the characters of reference marked thereon, FIG. 1 illustrates a preferred embodiment of the aircraft cabin management system of the present invention, designated generally as 10. The aircraft cabin management system (CMS) 10 includes: a communication interface system, designated generally as 12; a seat interface system, designated generally as 14; two Cabin Distribution Unit (CDUs) 16, 18; and, a communication network 20.

The communication interface system 12 includes an integrated Cabin Server Unit (CSU) 22 for providing the combined functionality of aircraft communications, networking, and computational resources. It also includes an Information Maintenance Portal (IMP) 24 for providing maintenance access for the users of the aircraft cabin management system 10 and the users of avionics equipment 26. The communication interface system 12 is preferably below the floor.

The CSU 22 offers substantial benefits, including size, weight, and power, by consolidating the functionality of, what was heretofore, four separate Line Replaceable Units (LRUs) into a single unit. By consolidating multiple LRUs, the CSU reduces LRU space, power, and weight from the aircraft backbone. These have been consolidated without reducing functionality, or compromising on system integrity. These four functionalities include that of 1) a Cabin Server; 2) an Information Management System (IMS); 3) an Airborne Data Router (ADR); and, 4) a telephony switching system (PBX).

Consolidating the IMS, ADR, VOIP PBX, and basic CSU functions into a single multiservice CSU creates a single "smart" data router providing efficient communications between multiple domains. Those domains are the Avionics, Passenger (Cabin), and Off Aircraft Domains. Using "smart" data routing technologies through a dedicated security processor, the CSU efficiently routes traffic between the Avionics Full-Duplex Switched Ethernet (AFDX) network 28 to the cabin backbone network or routes traffic from an Aircraft Health Monitoring System (AHMS) system to a ground server thru the Off Aircraft Domain. This unique routing capability between multiple domains reflects the CSU as an extension to the Avionics network.

Unique to the CSU 22, is the ability to interconnect via AFDX to the flight deck, e.g. Rockwell Collins Fusion® flight deck. In a preferred embodiment, the CSU 22 replaces the current Rockwell Collins IMS-6000 provisioned on a Global Vision™ flight deck manufactured by Bombardier Aerospace. As an IMS replacement, the CSU provides a path for wireless data connection into the aircraft avionics systems via present data delivery infrastructures such as the Rockwell Collins' Data Delivery Infrastructure (DDI), which is a software entity in the IMS-6000. Typical data items transferred by the Data Distribution Service (DDS) (which is another software entity in the IMS-6000) within the CSU include maintenance data from the aircraft to the ground and flight management system (FMS) navigational databases, terminal charts and flight plan data from the ground to the aircraft.

Similar to the IMS-6000, the CSU 22 of the preferred embodiment provides maintenance personnel with Ethernet and wireless paths to the Onboard Maintenance System (OMS) on the Global Vision™ flight deck installation. The CSU functions as a print server, hosts the onboard data loader (ODL) software application that eliminates the need to use an external data loader device for avionics software, and provides storage for application software specific to the aircraft.

With the CSU preferably having all below floor systems connected to it, it serves as the communications gateway for devices above floor. The CSU preferably includes dual one gigabit fiber interfaces and provides access to the above floor units thru a managed Ethernet network.

In the present invention, as the CSU replaces the IMS 6000, the CSU now takes on a role acting as a secure gateway to the Avionics domain. As a secure gateway, the CSU reduces the need for multiple ARINC 429 connections to the cabin backbone equipment for functions such as AHMS reporting, FMS data for Airshow® moving map, communication control for power distribution, Avionic Cabin Printing functions to the cabin, and Aircraft Climate control. This gateway function also reduces the burden on the Avionic interfaces, as all functional communications can be consolidated and passed via the redundant AFDX network.

With the CSU providing the airborne data router functions, the CSU may route all traffic between the Passenger domain and the Off Aircraft domain. The CSU not only provides firewall security and multiple VLAN support, but also includes "smart" routing capabilities to select from multiple off aircraft communication systems.

It has "Smart" router capability that includes the following: 1) A Communications manager—manages ground/air connectivity via cellular, Satcom, WiFi, etc. 2) A Rules-based, configurable, air/ground router that chooses the most efficient path for air/ground data traffic. 3) The Rockwell Collins Data Delivery Infrastructure. The CSU is uniquely able to provide a router that enables intelligent selection of available data channels for voice and data communications.

The rules-based "smart" router 1) provides ground and air integration; 2) enables intelligent selection of data channel; 3) Enables intelligent selection of voice channel (using embedded PBX); 4) provides the least cost routing—router makes selection of comm channel based on configurable items such as channel bandwidth, channel cost, channel availability, data source or destination, file size, and priority. The router may open a channel right away for transmission, or hold data until on ground where more efficient, less costly means such as WiFi or Cellular are available.

Preferably integrated into the CSU is a Voice over IP PBX. This PBX function is preferably based on the SIP standard, making it easier to manage and allowing one to use any SIP phone (software or hardware). This integrated function of the CSU takes advantage of the off aircraft "smart" router functions allowing rules based selection of voice channels and off aircraft service providers. This reduces the need for a complex integration between a PBX system provider and a traditional Airborne Data Router.

As part of the CMS Backbone, the CSU preferably provides Ethernet interfaces to systems such as lighting controllers, waste systems, water systems, cabin amplifiers, and other essential aircraft systems. The CSU also preferably includes interfaces for discrete, RS-232, RS-485, RS-429, CAN bus, and digital Potentiometers to support the more traditional aircraft interfaces.

The Information Maintenance Portal (IMP) 24 supplements the integration of the IMS functionality in the CSU by preferably providing a single integrated maintenance point for maintenance activities for both the avionics system and the CMS Backbone.

The following user accessible ports are preferably provided:

Four (4) SIM card slots—the SIM cards are for an internal 4G cellular modem. Multiple SIM cards allow the cellular modem service to be automatically switched for cellular service providers in multiple cities/countries.

Two (2) SDXC card slots—available for multiple purposes, high capacity SDXC cards can be used for functions such as software and database loading (avionics and cabin) and log offloading.

One (1) USB 3.0 port—for flash or hard drives, serving the same purpose as the SDXC slots.

One (1) Ethernet port—for maintenance user access to the system networks with a laptop or other tools for diagnostics, integration, or test.

In addition to the 4G cellular modem, the IMP also preferably has a Wi-Fi client radio for connection to an off-aircraft (i.e. hanger area) WAP. Both the Wi-Fi and cellular radios are only enabled when the aircraft is on the ground. Only one of them needs to be active at any given time. Both provide IP connectivity between the aircraft and ground support systems. Supporting both types of radios improves the availability of achieving a usable off-aircraft connection.

The seat interface system 14 includes a set of Modular Seat Interface Units (MSIUs): MSIU 1A, MSIU 2A, MSIU 3A, MSIU 4A, MSIU 1B, MSIU 2B, MSIU 3B, MSIU 4B. Each MSIU provides device input/output connections for a defined portion of the interior of the aircraft cabin. The defined portion of the aircraft cabin is preferably a "half-zone" of the aircraft cabin. As used herein the term "half-zone" is defined to be a section of the cabin interior on either the left or right side of the aircraft which contains any of: a pair of seats facing a table; two pairs of seats facing a table; a credenza; a sofa; or, a crew rest compartment. Thus, MSIU 1A is located in Zone 1A of the aircraft; MSIU 2A is located in Zone 2A, etc., as shown in FIG. 1.

Each MSIU provides for the breakout of the seat and zonal I/O devices located in a half-zone. In the embodiment shown in FIG. 1, the CMS Backbone architecture has one MSIU installed per half-zone. The MSIU is equipped to accommodate all seat interfaces (Ethernet jacks, Switch Panels, High Definition Touch Screen Equipment (HTSE), Audio In, Audio Out, Mic In, USB jack) along with zonal interfaces (HDMI jack input, relays for reading/table lights and Floormat heaters, and Ethernet jacks for bulkhead monitors or a printer). Each MSIU also has discrete inputs to allow for the installation of a discrete switch panel. An example of such a need would be for cabin door control.

Each MSIU is a small unit (i.e. about 6"×5"×2.5") which facilitates installation in the dado. (A dado is sidewall of the aircraft between the ledge and the floor.) Each MSIU has low power needs (i.e. about 48 W Max power draw, but only 25 WMax internal thermal load) and therefore requires less cooling and is ideal for the dado installation environment. The MSIUs are easy to install. There is minimal wiring. All local zone wiring is connected to the MSIU. Only a fiber gigabit cable is required to run from one MSIU to another MSIU. The MSIUs are very flexible and be used for a variety of zone configurations (i.e. single club, conference group, divan, etc.) without the need of adding additional LRUs. They are very robust. In case of a MSIU failure, only the associated half zone will be lost without impact to the rest of the cabin. Each MSIU preferably has spare interfaces and spare module slots available. New module types can also be developed for future needs.

The preferred embodiment includes two Cabin Distribution Units (CDUs) 16, 18 that interconnect forming the above floor CMS Backbone. Dual twelve strand fiber optic cable loops, provide 240 Gbps bandwidth between each of the CDUs. Two of the fibers create a 10 Gbps Ethernet channel for backbone data communication. The remaining twenty two strands are used for 10 Gbps serial data streams for uncompressed video or other future applications.

Each CDU incorporates a serial cross point switch acting as a multiplexer onto the fiber optic network. The cross point switch allows for provisioning fiber strands to various traffic types such as HD-SDI and 3G-SDI. Coupled together with a twenty four port managed Ethernet switch, the CDU consolidates all data traffic and redundantly routes it throughout the cabin. The CDU managed Ethernet switch provides 1 Gbps connections to the Modular Seat Interface Units which consolidates traffic from the MSIU ring onto the backbone network and provides a redundant path for MSIU traffic.

The CDU utilizes a modular chassis design. With six modular slots the CDU can be custom equipped with any of the currently defined modular cards.

The communication network 20 operatively interconnects the communication interface system 12; the seat interface system 14; and the CDUs 16, 18, as well as other equipment installed in the aircraft. The communication network 20 may include, for example, a 10 Gbps Ethernet and 1 Gbps Ethernet arranged in rings for redundancy, as shown in FIG. 1.

Moving most of the LRUs above floor makes it easier for the completion center of the manufacturer to install and customize aircraft configurations.

The foregoing detailed description has set forth various embodiments of the devices and/or processes via the use of a block diagram and examples. Insofar as the block diagram and examples contain one or more functions and/or operations, it will be understood by those within the art that each function and/or operation within the block diagram and examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a hard disk drive, a Compact Disc (CD), a Digital Video Disk (DVD), a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. An aircraft cabin management system, comprising:
   a) a communication interface system, comprising;
      i) an integrated Cabin Server Unit (CSU) configured to provide a combined functionality of aircraft communications, networking, and computational resources, said CSU including an Avionics Full-Duplex Switched Ethernet (AFDX) interface; and,
      ii) an Information Maintenance Portal (IMP) providing maintenance access for users of the aircraft cabin management system and users of avionics domain equipment;
   b) a seat interface system comprising a plurality of Modular Seat Interface Units (MSIUs), each MSIU providing device input/output connections for solely a defined portion of an interior of an aircraft cabin of an aircraft;
   c) at least one Cabin Distribution Unit (CDU); and,
   d) a communication network for operatively interconnecting said communication interface system; said seat interface system; and said at least one CDU, as well as other equipment installed in the aircraft,
   wherein the aircraft cabin management system provides an integrated communications and service backbone;
   wherein said defined portion of said interior comprises a half-zone, said half-zone being defined to be a section of the cabin interior on either a left or right side of the aircraft which contains any of:
      a pair of seats facing a table; two pairs of seats facing a table; a credenza;
      a sofa; or, a crew rest compartment; and,
   wherein said CSU includes a functionality of an Airborne Data Router (ADR) and the seat interface system is configured such that in case of a MSIU failure, only an associated half zone will be lost.

2. The aircraft cabin management system of claim 1, wherein said CSU includes a functionality of a telephony switching system (PBX).

3. The aircraft cabin management system of claim 1, wherein said CSU includes a functionality of an Information Management System (IMS).

4. The aircraft cabin management system of claim 1, wherein said CSU includes a functionality of a Cabin Server.

5. The aircraft cabin management system of claim 1, comprising two or more of said CDUs.

6. The aircraft cabin management system of claim 1, comprising two or more of said CSUs.

7. The aircraft cabin management system of claim 1, wherein each MSIU comprises:
   a) seat interfaces, from a set including: Ethernet jacks; Switch Panels; High Definition Touch Screen Equipment (HTSE); Audio In; Audio Out; Mic In; USB jack; and,
   b) zonal interfaces, from the set including: an HDMI jack input; relays for reading/table lights and Floormat heaters; and, Ethernet jacks for bulkhead monitors or a printer.

8. The aircraft cabin management system of claim 1, wherein said CSU further includes the functionality of a telephony switching system (PBX), Information Management System (IMS), and Cabin Server.

9. An aircraft cabin management system, comprising:
   a) a communication interface system, comprising;
      i) an integrated Cabin Server Unit (CSU) configured to provide a combined functionality of aircraft communications, networking, and computational resources, said CSU including an Avionics Full-Duplex Switched Ethernet (AFDX) interface; and,
      ii) an Information Maintenance Portal (IMP) providing maintenance access for the users of the aircraft cabin management system and the users of avionics domain equipment;
   b) a seat interface system comprising a plurality of Modular Seat Interface Units (MSIUs), each MSIU providing device input/output connections for solely a defined half-zone of an interior of an aircraft cabin of an aircraft, wherein a half-zone is defined to be a section of the cabin interior on either a left or right side of the aircraft which contains any of:
      a pair of seats facing a table; two pairs of seats facing a table; a credenza; a sofa; or, a crew rest compartment;
   c) at least one Cabin Distribution Unit (CDU); and,
   d) a communication network for operatively interconnecting said communication interface system; said seat interface system; and said at least one CDU, as well as other equipment installed in the aircraft,
   wherein the aircraft cabin management system provides an integrated communications and service backbone and the seat interface system is configured such that in case of a MSIU failure, only an associated half zone will be lost.

10. The aircraft cabin management system of claim 9, wherein said CSU includes a functionality of an Airborne Data Router (ADR).

11. The aircraft cabin management system of claim 9, wherein said CSU includes a functionality of a telephony switching system (PBX).

12. The aircraft cabin management system of claim 9, wherein said CSU includes a functionality of an Information Management System (IMS).

13. The aircraft cabin management system of claim 9, wherein said CSU includes a functionality of a Cabin Server.

14. The aircraft cabin management system of claim 9, wherein said CSU includes an Avionics Full-Duplex Switched Ethernet (AFDX) interface for communication with said avionics domain equipment.

15. The aircraft cabin management system of claim 9, comprising two or more of said CDUs.

16. The aircraft cabin management system of claim 1, comprising two or more of said CSUs.

17. The aircraft cabin management system of claim 9, wherein each MSIU comprises:
   a) seat interfaces, from a set including: Ethernet jacks; Switch Panels; High Definition Touch Screen Equipment (HTSE); Audio In; Audio Out; Mic In; USB jack; and,
   b) zonal interfaces, from the set including: an HDMI jack input; relays for reading/table lights and Floormat heaters; and, Ethernet jacks for bulkhead monitors or a printer.

18. The aircraft cabin management system of claim 9, wherein said CSU further includes the functionality of an Airborne Data Router (ADR), telephony switching system (PBX), Information Management System (IMS), and Cabin Server.

19. A method for managing an aircraft cabin, comprising the steps of:
  a) providing a communication interface system, comprising:
    i) an integrated Cabin Server Unit (CSU) providing a combined functionality of aircraft communications, networking, and computational resources, said CSU including an Avionics Full-Duplex Switched Ethernet (AFDX) interface; and,
    ii) an Information Maintenance Portal (IMP) providing maintenance access for the users of the aircraft cabin management system and the users of avionics domain equipment;
  b) providing a seat interface system comprising a plurality of Modular Seat Interface Units (MSIUs), each MSIU providing device input/output connections for solely a defined portion of an interior of an aircraft cabin of an aircraft;
  c) providing at least one Cabin Distribution Unit (CDU); and,
  d) providing a communication network for operatively interconnecting said communication interface system; said seat interface system; and said at least one CDU, as well as other equipment installed in the aircraft,
    wherein the aircraft cabin management system provides an integrated communications and service backbone,
  wherein said defined portion of said interior comprises a half-zone, said half-zone being defined to be a section of the cabin interior on either a left or right side of the aircraft which contains any of:
    a pair of seats facing a table; two pairs of seats facing a table; a credenza;
    a sofa; or, a crew rest compartment,
  and wherein the seat interface system is configured such that in case of a MSIU failure, only an associated half zone will be lost.

* * * * *